US009876207B2

(12) United States Patent
Tokoo et al.

(10) Patent No.: US 9,876,207 B2
(45) Date of Patent: Jan. 23, 2018

(54) BATTERY MODULE

(71) Applicant: HITACHI AUTOMOTIVE SYSTEMS, LTD., Hitachinaka-shi, Ibaraki (JP)

(72) Inventors: Naoya Tokoo, Tokyo (JP); Osamu Kubota, Tokyo (JP); Hidekazu Fujimura, Tokyo (JP); Michihiro Kimura, Hitachi (JP); Naoki Kojima, Hitachinaka (JP); Takashi Suzuki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 102 days.

(21) Appl. No.: 14/899,193

(22) PCT Filed: May 28, 2014

(86) PCT No.: PCT/JP2014/064054
§ 371 (c)(1),
(2) Date: Dec. 17, 2015

(87) PCT Pub. No.: WO2014/203694
PCT Pub. Date: Dec. 24, 2014

(65) Prior Publication Data
US 2016/0149180 A1 May 26, 2016

(30) Foreign Application Priority Data
Jun. 19, 2013 (JP) ................. 2013-128753

(51) Int. Cl.
*H01M 2/14* (2006.01)
*H01M 10/0585* (2010.01)
*H01M 10/0525* (2010.01)
*H01M 10/6556* (2014.01)
(Continued)

(52) U.S. Cl.
CPC .......... *H01M 2/14* (2013.01); *H01M 2/1077* (2013.01); *H01M 10/0525* (2013.01);
(Continued)

(58) Field of Classification Search
None
See application file for complete search history.

(56) References Cited

U.S. PATENT DOCUMENTS

2008/0063934 A1    3/2008  Bechtold et al.
2008/0160395 A1    7/2008  Okada et al.
(Continued)

FOREIGN PATENT DOCUMENTS

JP    2001-313018  A       11/2001
JP    2001313018   A   *   11/2001
(Continued)

*Primary Examiner* — Daniel Gatewood
(74) *Attorney, Agent, or Firm* — Volpe and Koenig, P.C.

(57) ABSTRACT

The present invention proposes a structure of a battery module in which a spacer can slide by means of a guide member constituting the battery module and can be positioned. A battery module according to the present invention is a battery module 9 provided with a battery block 8 in which a plurality of rectangular battery cells 1 are arranged and laminated, and includes a spacer 2 which intervenes between the plurality of battery cells 1, guide members 4 and 5 which slidably support the spacer 2 along a laminating direction of the battery cells 1, and end plates 3 as a pair which are respectively arranged on one side and the other side of the guide members 4 and 5 in a sliding direction and which sandwich the battery block 8 from both sides in the sliding direction.

2 Claims, 12 Drawing Sheets

(51) Int. Cl.
  *H01M 10/613* (2014.01)
  *H01M 2/10* (2006.01)
  *H01M 10/625* (2014.01)
  *H01M 10/647* (2014.01)
  *H01M 10/6555* (2014.01)

(52) U.S. Cl.
  CPC ..... *H01M 10/0585* (2013.01); *H01M 10/613* (2015.04); *H01M 10/625* (2015.04); *H01M 10/647* (2015.04); *H01M 10/6555* (2015.04); *H01M 10/6556* (2015.04)

(56) References Cited

U.S. PATENT DOCUMENTS

| | | |
|---|---|---|
| 2008/0280194 A1 | 11/2008 | Okada |
| 2010/0297486 A1* | 11/2010 | Fujii ............... H01M 10/625 429/120 |
| 2011/0024207 A1* | 2/2011 | Higashino ........ H01M 2/0245 180/65.1 |
| 2012/0003526 A1 | 1/2012 | Kume et al. |

FOREIGN PATENT DOCUMENTS

| | | |
|---|---|---|
| JP | 2003346754 | 12/2003 |
| JP | 2008166191 A | 7/2008 |
| JP | 2008-282582 A | 11/2008 |
| JP | 2009-277646 A | 11/2009 |
| JP | 2010-272251 A | 12/2010 |
| JP | 2012-014962 A | 1/2012 |
| JP | 2012094507 A | 5/2012 |
| JP | 2013-225377 A | 10/2013 |

\* cited by examiner

BATTERY MODULE

TECHNICAL FIELD

The present invention relates to a battery module configured by connecting a plurality of rectangular lithium ion secondary batteries enabling charge and discharge.

BACKGROUND ART

A lithium ion secondary battery (hereinbelow, a lithium ion battery) utilizing absorption and desorption of lithium ions for charge-discharge reactions attracts great expectations as a battery that can be used in various applications such as a power supply for a portable electronic device such as a mobile phone and a notebook computer, an auxiliary power supply for disasters, and a power supply for a moving vehicle such as a car and a motorcycle for the reasons that larger energy density than that of a conventional lead battery or nickel-cadmium battery can be obtained, that lithium contributing to the charge-discharge reactions is rarely deposited on electrodes as metal lithium, that reproducibility of the capacity after repeated charge and discharge is excellent to provide a stable charge-discharge characteristic, and the like.

In particular, examples of the car are a zero-emission electric car mounting a motor driven by power from the secondary battery and traveling by means of the driving force from the motor, a hybrid electric car mounting both an engine using fossil fuel and the motor, and a plug-in hybrid electric car charging the secondary battery directly from a system power supply.

In a case in which this lithium ion battery is mounted on the hybrid car, the zero-emission electric car, or the like, the lithium ion battery often employs a structure in which a plurality of battery cells are connected in series, in parallel, or by combining the serial connection with the parallel connection to constitute an assembled battery (a battery module), and in which the battery module is housed in a chassis since load voltage and load capacity required for the lithium ion battery increase.

In each battery cell of the lithium ion battery, the electrodes expand at the time of charge and discharge, and a distance between a positive-electrode terminal and a negative-electrode terminal is enlarged, which causes an increase in internal resistance and reduction in output. Thus, the expansion needs to be restricted. Also, the battery cell is constituted by a metallic exterior can, and when the exterior cans having different potentials are electrically connected, short circuit current flows. Thus, the battery cells need to be insulated from each other.

For these reasons, there is proposed a battery block in which a plurality of rectangular battery cells each having a positive-electrode terminal and a negative-electrode terminal on an equal surface are arranged and laminated, having a structure in which spacers directly holding the battery cells and keeping the insulating state between the adjacent battery cells and a pair of highly rigid end plates at both ends of the battery block are arranged in a laminating direction of the battery cells, and in which a distance of the endplates is kept constant in a state in which the endplates are pressed from both the ends by a coupling and fixing tool (refer to PTL 1).

CITATION LIST

Patent Literature

PTL 1: Publication of JP 2008-282582 A

SUMMARY OF INVENTION

Technical Problem

In the method of fixing the battery block in the state in which the distance of the end plates is kept constant, effective load to be applied to the battery block varies significantly due to a tolerance of the thickness of the battery cell. For example, when only the battery cells having small thickness dimensions within a tolerance range are arranged, the effective load to be applied to the battery block fitting in the constant distance is low. Conversely, when only the battery cells having large thickness dimensions within the tolerance range are arranged, the effective load to be applied to the battery block fitting in the constant distance is high. Consequently, even when battery modules have equal dimensions, the load to be applied to the battery blocks significantly varies among the respective battery modules. In a case in which the load significantly varies, characteristic deterioration of the battery module in which the battery module is not fixed with appropriate load cannot be restricted sufficiently. Under such circumstances, a structure in which each battery block can be fixed with an appropriate end plate distance or appropriate load for the battery block is required. Also, since the battery module for use in the car requires vibration resistance, a module structure having high assembling accuracy and strong vibration resistance is desired.

The present invention is accomplished by taking the above respects into consideration, and an object of the present invention is to propose a structure of a battery module in which a spacer can slide by means of a guide member constituting the battery module and can be positioned.

Solution to Problem

A battery module of the present invention to achieve the above object is a battery module provided with a battery block in which a plurality of rectangular battery cells are arranged and laminated, including: a spacer which intervenes between the plurality of battery cells; a guide member which slidably supports the spacer along a laminating direction of the battery cells; and end plates as a pair which are respectively arranged on one side and the other side of the guide member in a sliding direction and which sandwich the battery block from both sides in the sliding direction.

Advantageous Effects of Invention

According to the present invention, a spacer can be arranged at an arbitrary position in a laminating direction of battery cells. Accordingly, the distance of the end plates can be adjusted to be appropriate for a dimension of a battery block, and the battery block can be fixed with appropriate load. Accordingly, even when there is a tolerance among the respective battery cells, a battery module of which characteristic deterioration has been restricted can be produced. Also, since a guide member has a fitting structure that helps positioning of the spacer, assembling accuracy can be improved, and vibration resistance can also be improved.

DESCRIPTION OF EMBODIMENTS

Hereinbelow, the best mode for carrying out the present invention will be described by specific embodiments, and the present invention is not limited to these embodiments. Also, figures in the embodiments are schematically illustrated, and accuracy of positional relationship, dimensions, and the like in the figures is not assured. The present invention can be altered and modified in various ways by those skilled in the art within the scope of technical ideas disclosed in the present description. Also, over the figures provided to describe the present invention, the same reference signs designate components having similar or identical functions, and description of the duplicate components is omitted in some cases.

First Embodiment

Figure 1:
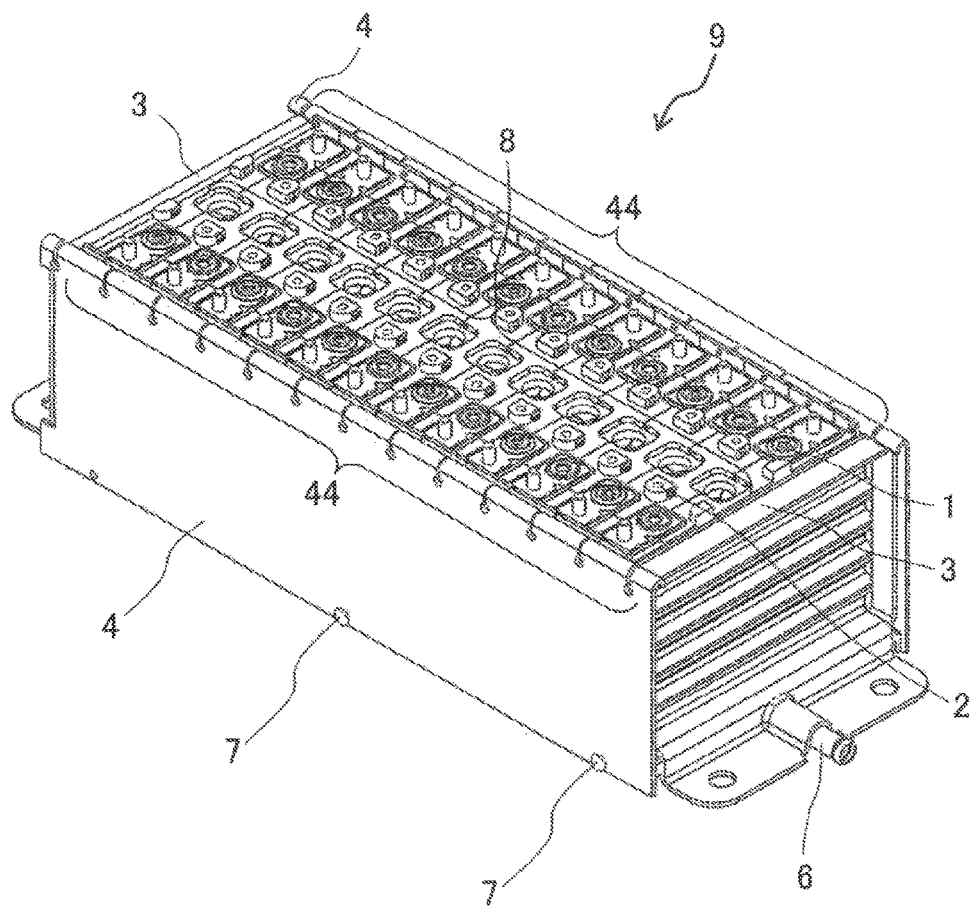
FIG. 1 is an external perspective view of a battery module according to a first embodiment.
Figure 2:
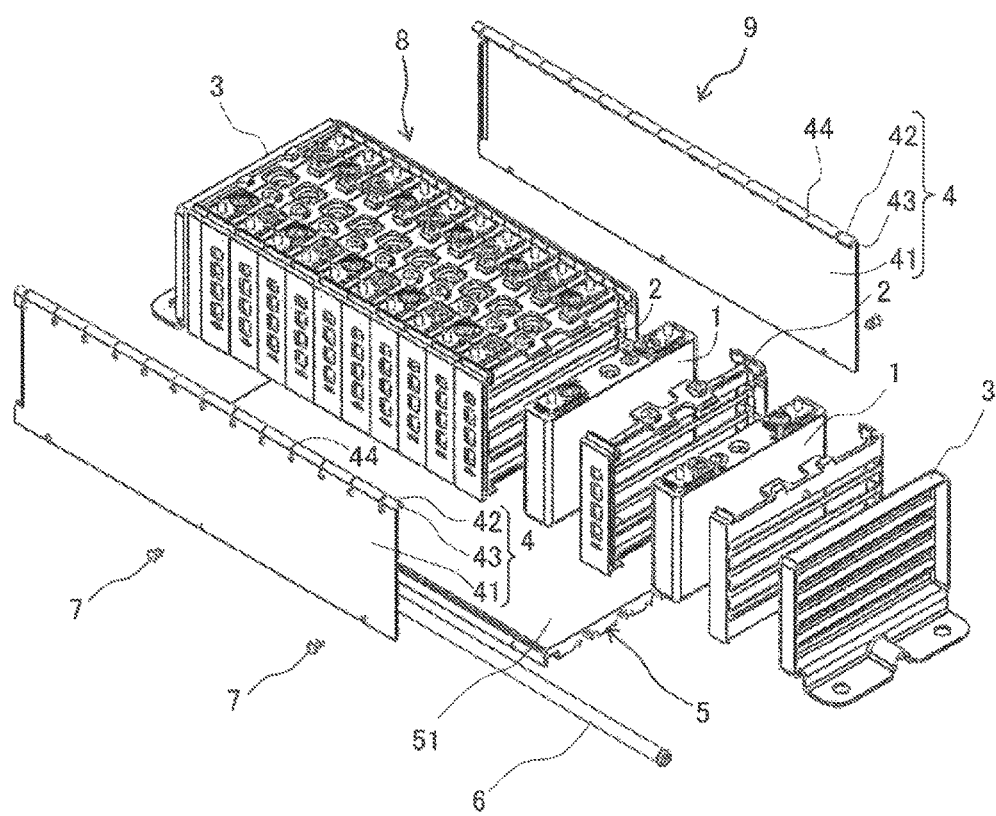
FIG. 2 is an exploded perspective view of the battery module according to the first embodiment.

FIG. 1 is an external perspective view of a battery module according to the present embodiment, and FIG. 2 is an exploded perspective view thereof.

A battery module 9 includes a battery block 8 in which a plurality of rectangular battery cells 1 are arranged and laminated. Spacers 2 intervene between the plurality of battery cells 1. The spacer 2 is hereinbelow referred to as a cell holder since a pair of the spacers 2 has a structure of holding the battery cell 1 when the spacers 2 as the pair are combined. The battery module 9 includes a guide member slidably supporting the cell holders 2 along a laminating direction of the battery cells 1 (refer to FIG. 5). On one side and the other side of the guide member in the sliding direction, end plates 3 as a pair are respectively provided to sandwich the battery block 8 from both the sides in the sliding direction.

The guide member includes a pair of side plates 4 opposed to side surfaces of the battery block 8 and a base plate 5 opposed to a bottom portion of the battery block 8. A material for the side plates 4 can be selected from various materials such as metal and resin. The pair of side plates 4 includes a pair of side surface opposed portions 41 opposed to both side surfaces of the battery cell 1 in a cell width direction and upper surface opposed portions 42 opposed to an upper surface of the battery cell 1 on an upper side in a cell height direction, and each upper surface opposed portion 42 is provided with a fitting recess portion 43 recessed in a direction perpendicular to the sliding direction, extending along the sliding direction, and fitted with a below-mentioned fitting protrusion portion 26 of the cell holder 2. The fitting recess portion 43 has a cross-section formed in a semi-circular shape recessed upward.

Also, the upper surface opposed portion 42 of the side plate 4 is provided with slits 44 at predetermined spaces in the sliding direction and is adapted to bias each cell holder 2 in the direction perpendicular to the sliding direction when the upper surface opposed portion 42 is swaged downward to enable a bottom surface PB of the battery cell 1 to be pressed toward a bottom surface opposed portion 51 of the base plate 5.

The base plate 5 includes the bottom surface opposed portion 51 opposed to the bottom surface PB of the battery cell 1 on a lower side in the cell height direction. The base plate 5 is provided with a cooling tube 6 circulating a refrigerant therein. As a material for the base plate 5, aluminum or an aluminum alloy can preferably be used in consideration of heat conductivity and formability.

Figure 3:
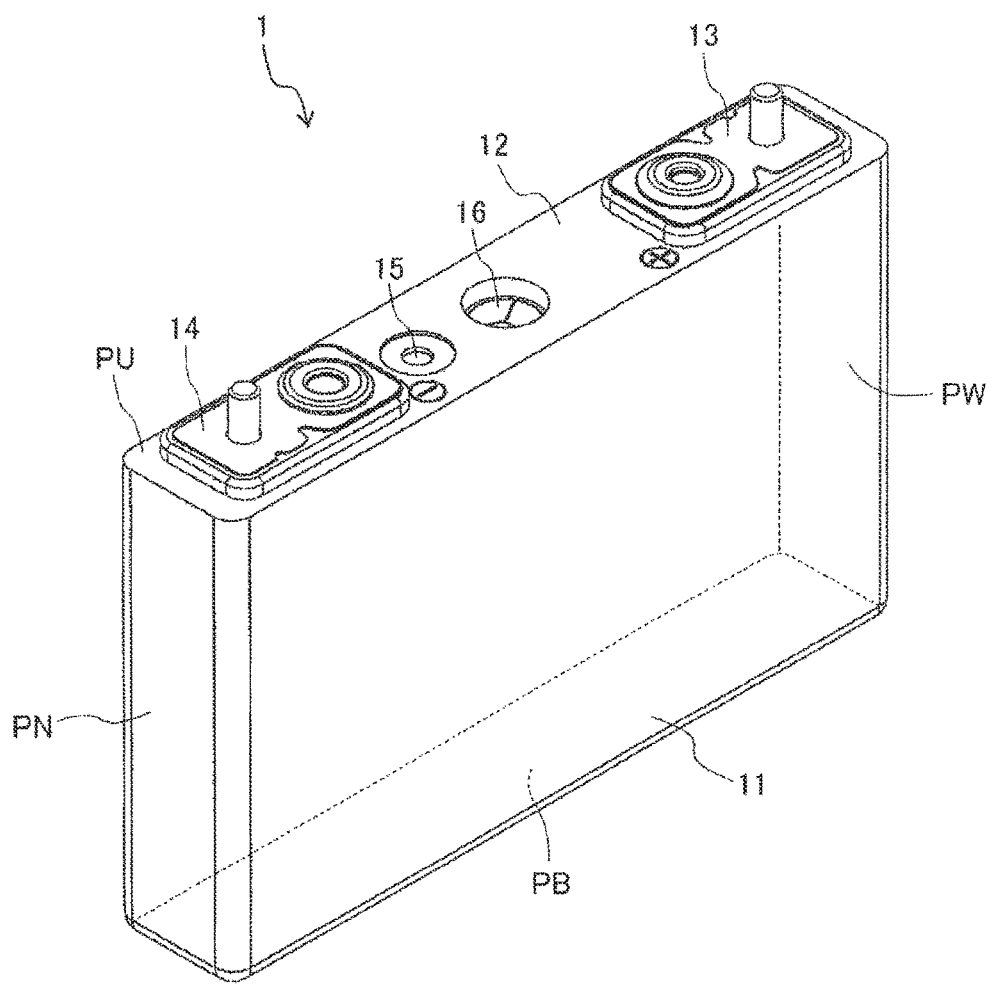
FIG. 3 is an external perspective view of a battery cell according to the first embodiment.

FIG. 3 is an external perspective view of the battery cell.

The battery cell 1 is a rectangular lithium ion secondary battery, in which an electrode group including a positive electrode and a negative electrode as well as non-aqueous electrolyte is housed in a battery container made of an aluminum alloy. The battery container of the battery cell 1 includes a flat box-shaped battery can 11 and a battery lid 12 sealing an opening portion of the battery can 11. The battery can 11 is a flat rectangular container formed by means of deep drawing process and includes the rectangular bottom surface PB, a pair of wide side surfaces PW erecting from long sides of the bottom surface PB, and a pair of narrow side surfaces PN erecting from short sides of the bottom surface PB.

The battery lid 12 is made of a rectangular flat plate member and includes an upper surface PU. The battery lid 12 is provided with a positive-electrode external terminal 13 and a negative-electrode external terminal 14 for voltage input/output. The positive-electrode external terminal 13 and the negative-electrode external terminal 14 are arranged to be away from each other in a direction of a long side of the battery lid 12.

From each of the positive-electrode external terminal 13 and the negative-electrode external terminal 14, a bolt for tightening a nut for tightening a bus bar is provided to protrude. The battery lid 12 is laser-welded on the battery can 11 to seal the opening portion of the battery can 11 after the electrode group is housed in the battery can 11.

At a middle position in the direction of the long side of the battery lid 12 are provided an inlet 15 for injecting the non-aqueous electrolyte into the battery can 11 and a gas exhaust valve 16 fissuring due to an increase of internal pressure to exhaust gas in the battery container. The plurality of battery cells 1 are arranged and laminated in a thickness direction thereof to constitute the battery block 8 of the battery module 9.

Figure 4:
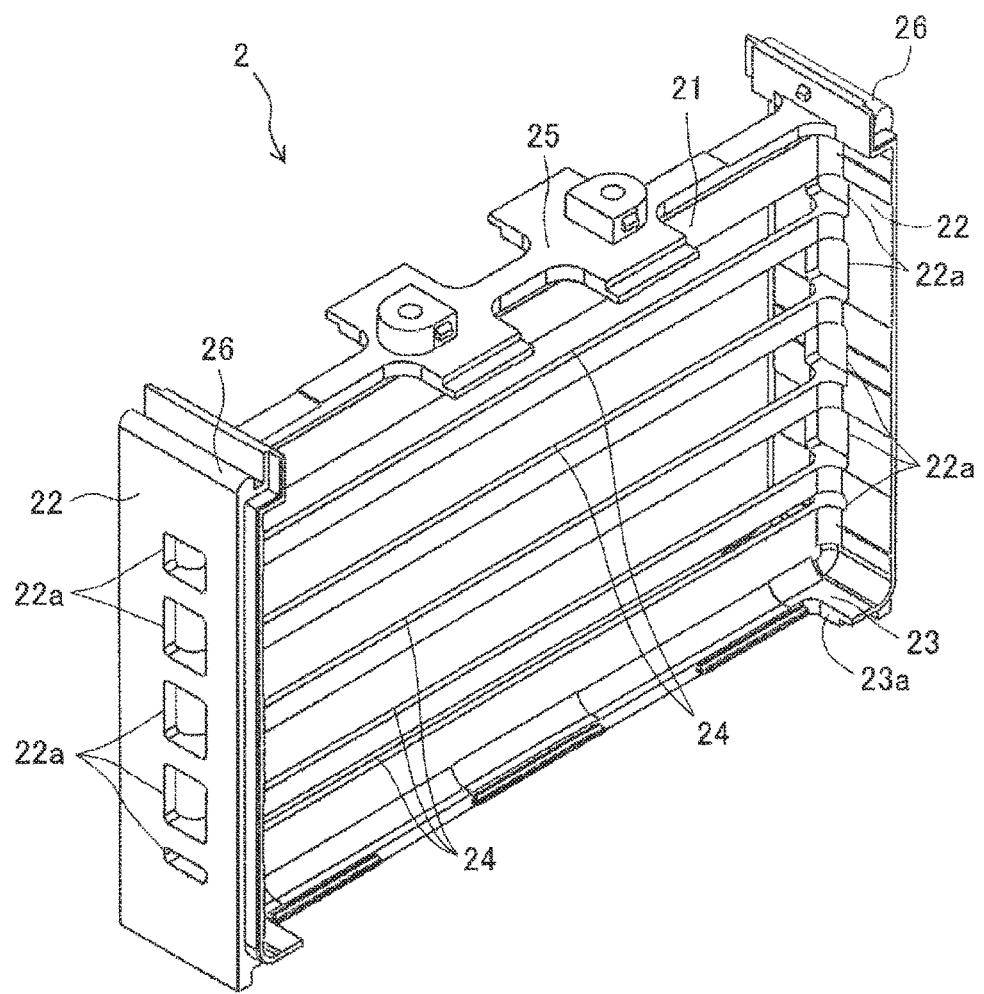
FIG. 4 is an external perspective view of a spacer according to the first embodiment.

FIG. 4 is an external perspective view of the cell holder.

The cell holder 2 is made of an insulating material and can be produced by shaping an engineering plastic such as PBT (polybutyleneterephtalate) and PC (polycarbonate), rubber, or the like.

The pair of the cell holders 2 has a structure of holding the battery cell 1 when the cell holders 2 as the pair are combined. Each cell holder 2 intervenes between the two battery cells 1. The cell holder 2 includes a holding wall portion 21 opposed to the wide side surface PW of the battery cell 1, a pair of side wall portions 22 facing each other at both end portions of the holding wall portion 21 in a cell width direction and intervening between the narrow side surfaces PN of the battery cell 1 on both sides in the cell width direction and the pair of side surface opposed portions 41, an upper wall portion 25 intervening between the upper surface PU of the battery cell 1 on an upper side in the cell height direction and the upper surface opposed portions 42, and a bottom wall portion 23 intervening between the bottom surface PB of the battery cell 1 on the lower side in the cell height direction and the bottom surface opposed portion 51. The upper wall portion 25 is provided with the fitting protrusion portions 26 fitted with the fitting recess portions 43. The fitting protrusion portions 26 have cross-sections formed in semi-circular shapes protruding upward at both end portions of the upper wall portion 25 in the cell width direction.

The holding wall portion 21 is sized to be opposed to the entire wide side surface PW of the battery cell 1 and is provided with a plurality of cut-out portions 24 cut out and opened with a constant height dimension over the cell width direction. The cut-out portions 24 communicate with opening portions 22*a* of the pair of side wall portions 22.

The side wall portions 22 as the pair project from both end portions of the holding wall portion 21 in the cell width direction toward one side and the other side in the laminating direction, extend over the cell height direction with a constant width, and are sized to be respectively opposed to the narrow side surfaces PN of the respective battery cells 1 arranged on one side and the other side in the laminating direction with the holding wall portion 21 interposed therebetween.

The bottom wall portion 23 projects from a lower end portion of the holding wall portion 21 in the cell height direction toward one side and the other side in the laminating direction, extends over the cell width direction with a constant width, and is sized to be opposed to the bottom surfaces PB of the respective battery cells 1 arranged on one side and the other side in the arranging direction with the holding wall portion 21 interposed therebetween. The bottom wall portion 23 is provided with a cut-out 23*a* adapted to expose the bottom surface PB of the battery cell 1 to cause the bottom surface PB to be opposed to the bottom surface opposed portion 51 of the base plate 5. The bottom surface PB of the battery cell 1 contacts the bottom surface opposed portion 51 of the base plate 5 via the cut-out 23*a*.

In a case in which two cell holders 2 are arranged to be combined, an end portion, on one side in the arranging direction, of the pair of side wall portions 22 and the bottom wall portion 23 of one cell holder 2, is opposed to and abuts on an end portion, on the other side in the arranging direction, thereof of the adjacent cell holder 2, so that the cell holders 2 may be continuous in the arranging direction. The end portion, on one side in the arranging direction, of the pair of side wall portions 22 and the bottom wall portion 23 of one cell holder 2, is opposed to the end portion, on the other side in the arranging direction, thereof of the adjacent cell holder 2, in a direction perpendicular to the arranging direction.

The pair of side wall portions 22 is provided with the plurality of opening portions 22*a* respectively communicating with the respective cut-out portions 24 of the holding wall portion 21 to enable cooling air to flow from the opening portions 22*a* of the side wall portion 22 on one side in the cell width direction into the cut-out portions 24 of the holding wall portion 21 and to enable the cooling air that has passed through the cut-out portions 24 to flow out of the opening portions 22*a* of the side wall portion 22 on the other side in the cell width direction, for example. It is to be noted that the present embodiment does not have such a structure of letting cooling air flow into the opening portions 22*a* and the cut-out portions 24.

Figure 5:
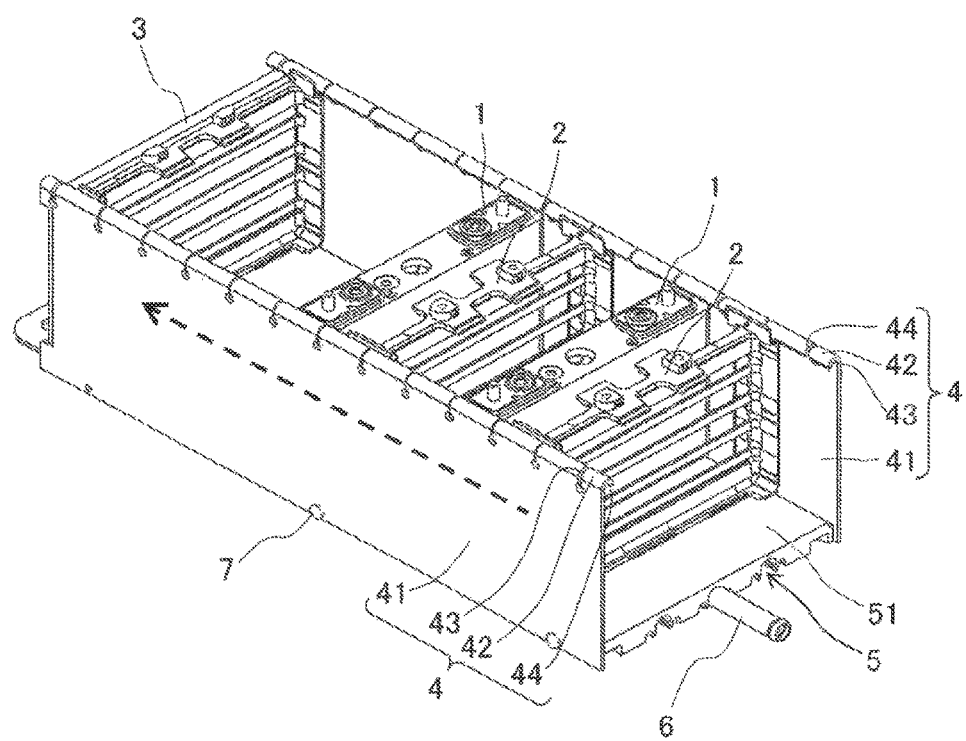
FIG. 5 is an external perspective view describing a method for assembling the battery module according to the first embodiment.

FIG. 5 is an external perspective view describing a method for assembling the battery module according to the present embodiment.

The pair of side plates 4 is fixed to the base plate 5 by rivets 7. One endplate 3 is swaged and fixed to the side plates 4 in advance (back side in FIG. 5). The cell holders 2 and the battery cells 1 are slid and laminated in a direction of the arrow in FIG. 5, using the side plates 4 and the base plate 5 as the guide member. The respective battery cells 1 are inserted in order of arranging the positive-electrode external terminals 13 and the negative-electrode external terminals 14 alternately in the sliding direction.

After all the cell holders 2 and the battery cells 1 are inserted, the other endplate 3 is welded and fixed to the side plates 4 (front side in FIG. 5).

Here, the method for first fixing the end plate 3 to the side plates 4 is not limited to swaging but may be fixing with use of screws, rivets, bolts, or the like. The method for fixing the other end plate 3 is not limited to welding but may be fixing with use of screws, rivets, bolts, or the like after swaging, pressing, or additional hole processing. Also, although the side plates 4 are fixed to the base plate 5 by the rivets 7, the side plates 4 may be fixed with use of screws, rivets, bolts, or the like. The side plates 4 are pressed to slightly swage the upper portions thereof and are fixed by applying load to the respective cell holders 2 in an up-down direction.

Figure 6:
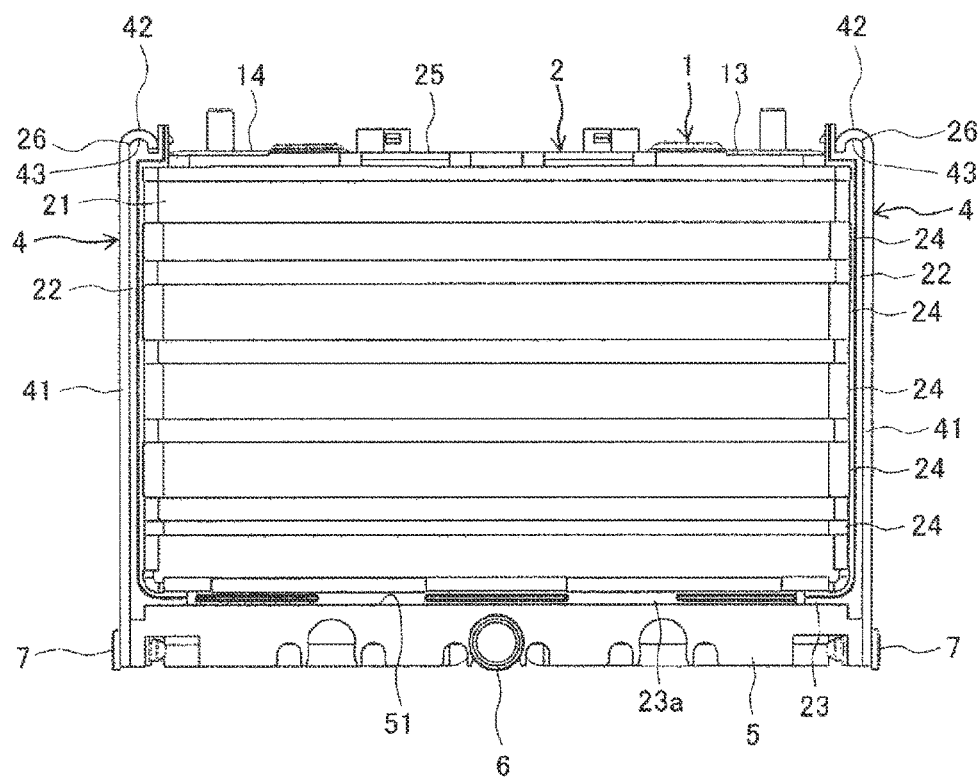
FIG. 6 is a side view illustrating a fitting structure between side plates and the spacer according to the first embodiment.

FIG. 6 is aside view illustrating a fitting structure between the side plates and the cell holder according to the present embodiment.

In the battery cell 1, the wide side surface PW is opposed to the holding wall portion 21 of the cell holder 2, the narrow side surface PN is opposed to the side wall portion 22 of the cell holder 2, the bottom surface PB is opposed to the bottom wall portion 23 of the cell holder 2, and the upper surface PU is opposed to the upper wall portion 25 of the cell holder 2. Accordingly, the battery cell 1 is held in the cell holder 2 in a state in which movement against the cell holder 2 in the laminating direction and in the direction perpendicular to the laminating direction is restricted.

In the cell holder 2, the side wall portion 22 is opposed to the side surface opposed portion 41 of the side plate 4, the bottom wall portion 23 is opposed to the bottom surface opposed portion 51 of the base plate 5, and the upper wall portion 25 is opposed to the upper surface opposed portion 42 of the side plate 4. The fitting protrusion portion 26 provided at the upper wall portion 25 of the cell holder 2 is fitted with the fitting recess portion 43 provided at the upper surface opposed portion 42 of the side plate 4. Accordingly, the cell holder 2 is supported to be movable along the laminating direction in a state in which movement against the side plate 4 and the base plate 5 in the direction perpendicular to the laminating direction is restricted.

In the present embodiment, the fitting part between the cell holder 2 and the side plate 4 employs an R-R fitting structure, in which the fitting protrusion portion and the fitting recess portion having semi-circular cross-sections are combined. Due to this fitting structure, since the cell holder 2 can be positioned in the up-down and right-left directions of a plane perpendicular to the laminating direction of the battery cells 1, the battery module 9 excellent in assembling performance and assembling accuracy can be produced. Thus, the battery module 9 produced to have this structure is characterized by high vibration resistance. Also, since the cell holders 2 can be arranged at arbitrary positions in the laminating direction of the battery cells 1, each battery block 8 can be fixed at a fixing position, that is, with fixing load, corresponding to the dimension of the battery block 8 even when there is a tolerance among the battery cells 1.

Further, by pressing the upper portion of the side plate 4 sectioned by the slits 44 to be slightly swaged and fixing the respective cell holders 2 while applying load in the up-down direction to the cell holders 2, the tolerance of the dimensions of the respective cell holders 2 in the up-down direction is absorbed, and fixing in a state of applying load can be performed. As for the fitting structure, numerous patterns can be applied other than the R-R fitting structure. Also, the fitting structure may be provided at a plurality of positions, not at two positions on the right and left.

Although the side plates 4 are fixed to the base plate 5 by the rivets 7, the fixing method is not limited to this, and various fixing methods such as fixing with use of screws or bolts are available. Although the base plate 5 is provided with one cooling tube 6, one tube processed in a U shape or S shape may be used, or a plurality of tubes may be used. The method for providing the cooling tube is not limited to these structures. Although the side plates 4 are used in the present embodiment, a guide member such as a metal band having a fitting structure may be used.

As described above, according to the present embodiment, since the cell holder 2 and the side plate 4 serving as the guide member have the R-R fitting structure to enable the cell holder 2 to slide against the side plate 4 and to be arranged at an arbitrary position, fixing in accordance with the dimension of the battery block 8 can be performed.

Also, according to the present embodiment, since the side plate 4 serving as the guide member can be used for positioning of the cell holder 2, improvement in assembling performance and assembling accuracy of the battery module 9 can be achieved as well as the aforementioned fixing in accordance with the dimension, and the battery module 9 having high vibration resistance can be produced.

Figure 12:
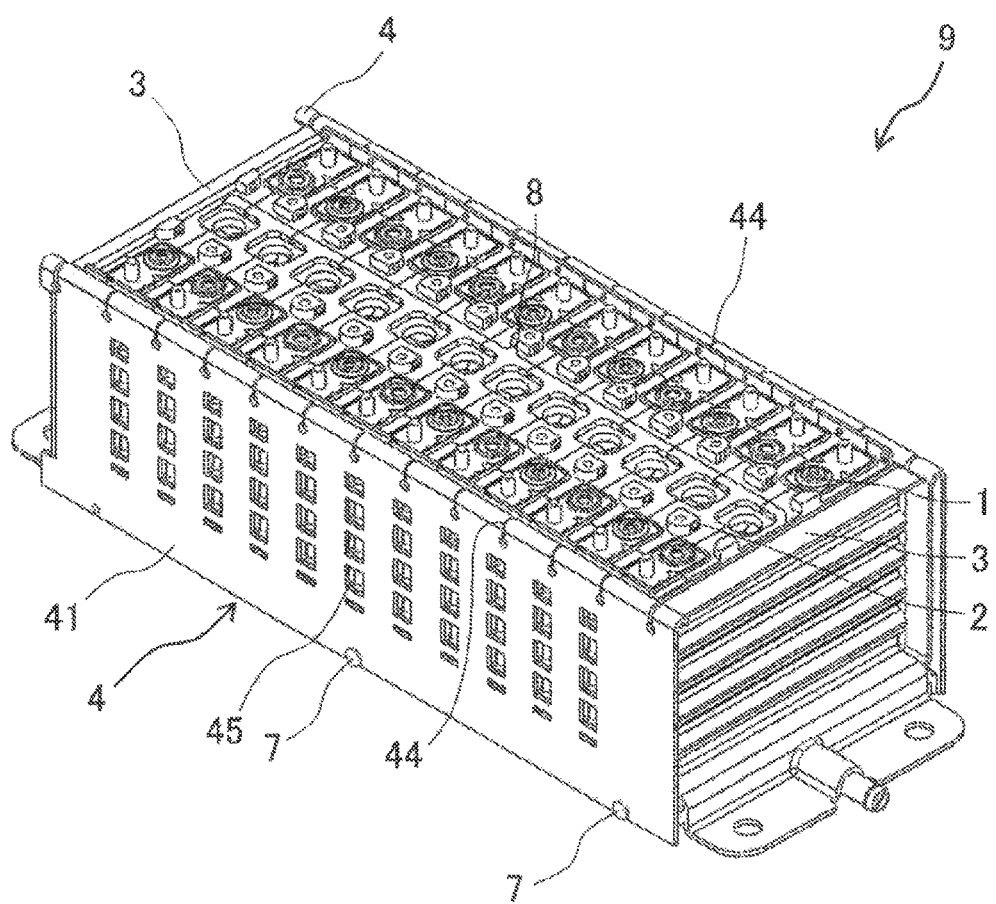
FIG. 12 is an external perspective view illustrating another example of the battery module according to the first embodiment.

Meanwhile, although the case in which the battery module 9 has a cooling structure consisting only of the cooling tube 6 provided in the base plate 5 has been described in the present embodiment, the present invention is not limited to this. For example, as illustrated in FIG. 12, the case may be combined with a configuration in which opening holes 45 communicating with the opening portions 22a of the cell holders 2 are provided to introduce cooling air into the cell holders 2 through the opening holes 45 so that cooling may be performed by letting the cooling air pass among the respective battery cells 1.

The present invention has been described above by the embodiment. The battery module according to the present invention can be used as an in-vehicle battery module to be mounted on a hybrid car, a zero-emission electric car, or the like, which uses a motor as a driving source. Also, application of the battery module according to the present invention is not limited to the above application. The power supply device according to the present invention can be used as a power storage system that charges a battery and stores power with electric power generated by solar power generation, wind power generation, or the like for any of household use, commercial use, and industrial use, as a power storage system that charges a battery and stores power with nighttime electric power, or as a power storage system that can be used in an extraterrestrial place such as the space station, a spaceship, and a space platform. Further, for industrial use, the present invention can be applied to a power supply of a medical device, a construction machine, an electric power storage system, an elevator, an unmanned moving vehicle, or the like, or a power supply for a moving vehicle such as a golf cart and a turret vehicle.

Second Embodiment

Next, a second embodiment of the present invention will be described below with reference to FIGS. 7 and 8.

Figure 7:
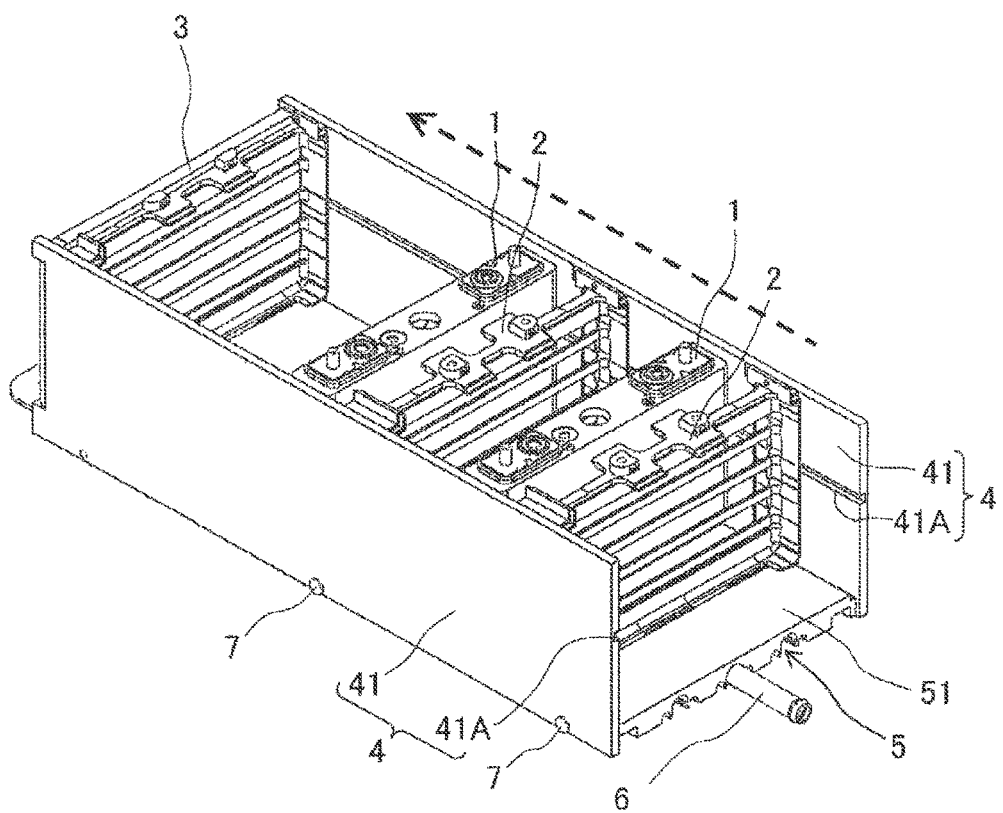
FIG. 7 is an external perspective view describing a method for assembling a battery module according to a second embodiment.
Figure 8:
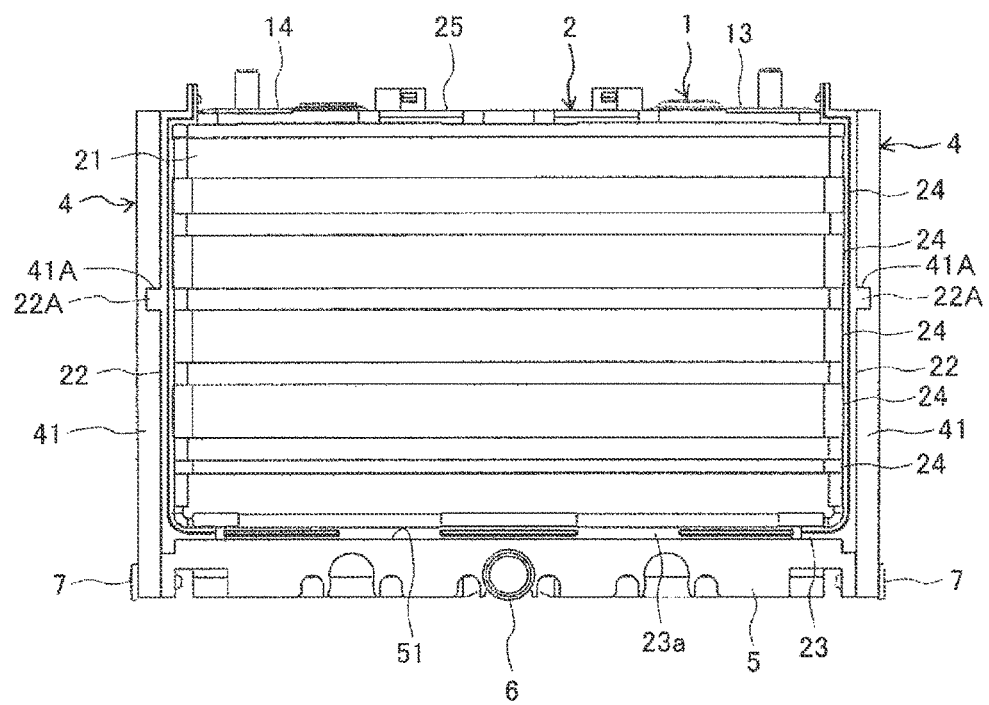
FIG. 8 is a side view illustrating a fitting structure between a side plates and a spacer according to the second embodiment.

FIG. 7 is an external perspective view describing a method for assembling the battery module according to the present embodiment, and FIG. 8 is a side view illustrating a fitting structure between the side plates and the spacer. It is to be noted that similar components to those in the first embodiment are shown with the same reference signs, and description of the duplicate components is omitted.

The present embodiment is characterized by a structure in which a fitting recess portion and a fitting protrusion portion are provided at the side surface opposed portion 41 of the side plate 4 and the side wall portion 22 of the cell holder 2 and in which the slits 44 in the first embodiment are omitted.

A fitting recess portion 41A is provided at the side surface opposed portion 41 of each of the paired side plates 4. A fitting protrusion portion 22A is provided at the side wall portion 22 of the cell holder 2 and is fitted with the fitting recess portion 41A. The fitting protrusion portion 22A is formed in a tenon shape having a rectangular cross-section extending over the side wall portion 22 in the sliding direction while the fitting recess portion 41A is formed in a mortise shape having a rectangular cross-section extending over the side surface opposed portion 41 in the sliding direction and fitted with the fitting protrusion portion 22A.

Figure 9:
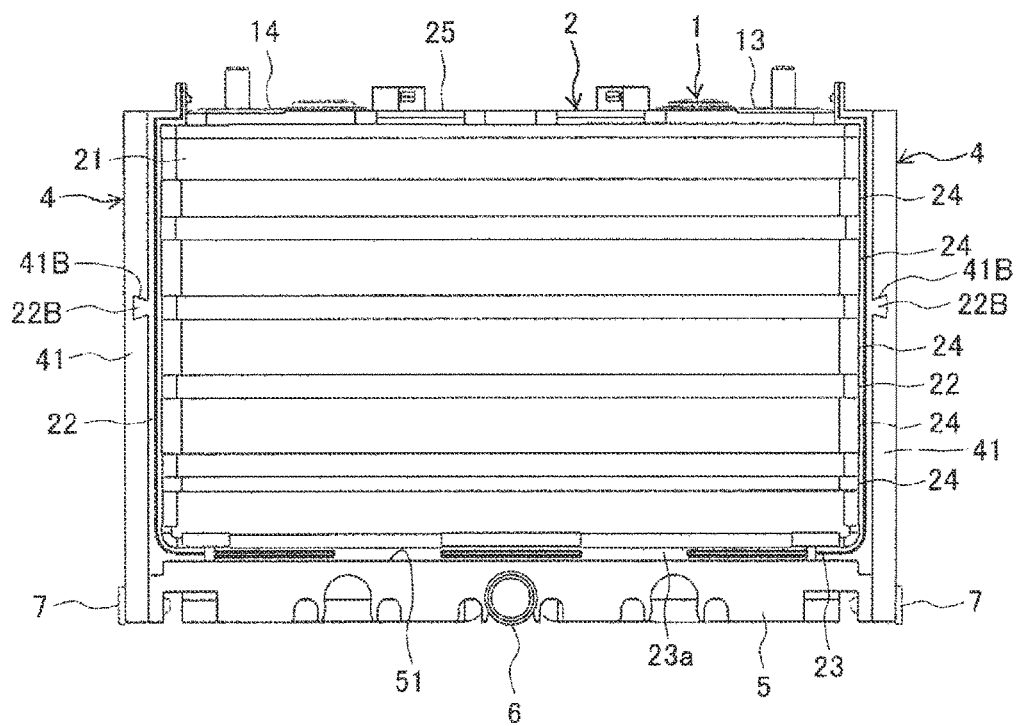
FIG. 9 is a side view illustrating another example of the fitting structure between the side plates and the spacer according to the second embodiment.
Figure 10:
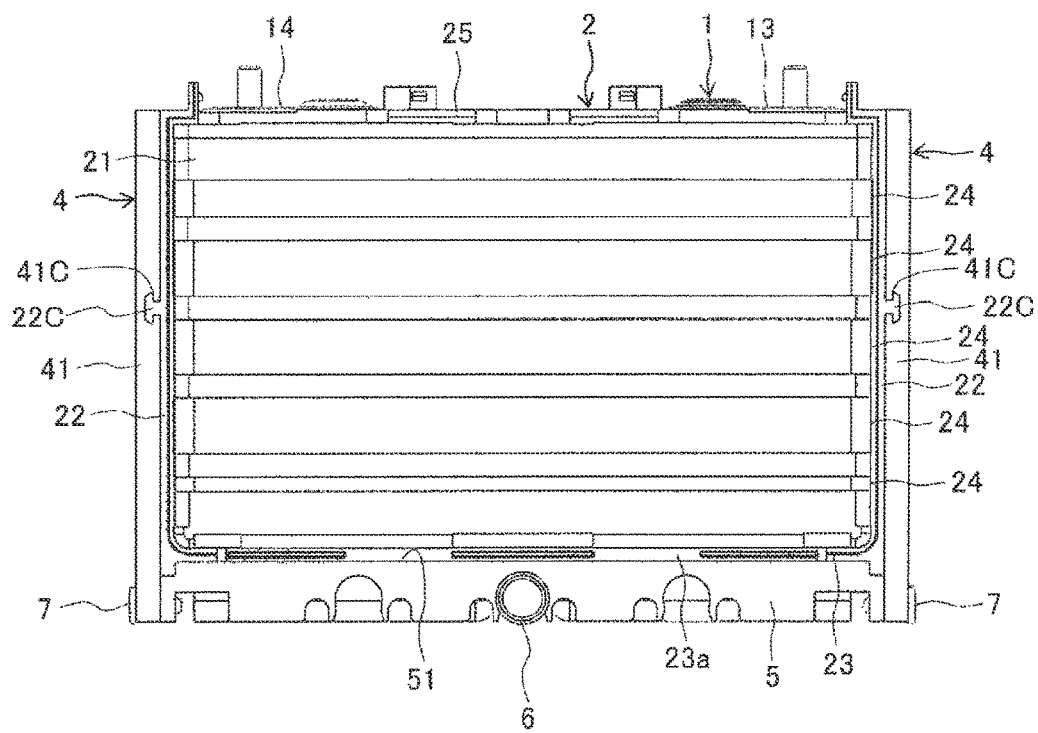
FIG. 10 is a side view illustrating another example of the fitting structure between the side plates and the spacer according to the second embodiment.
Figure 11:
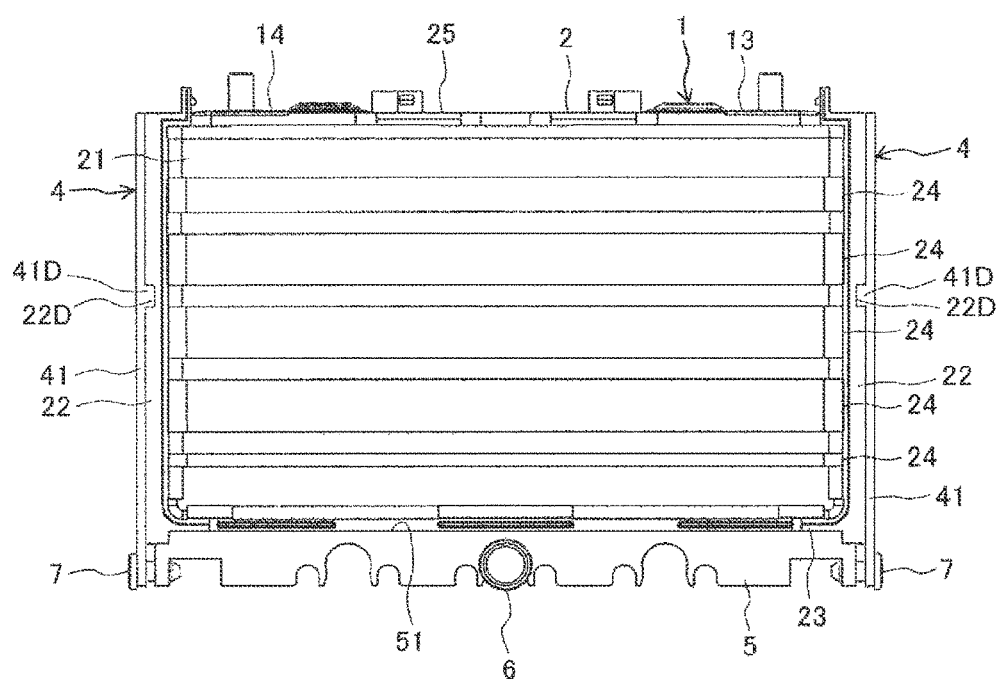
FIG. 11 is a side view illustrating another example of the fitting structure between the side plates and the spacer according to the second embodiment.

As for the fitting structure, structures such as a dovetail tenon and mortise structure illustrated in FIG. 9 and a gooseneck tenon and mortise structure illustrated in FIG. 10 are available other than the tenon and mortise fitting structure. Also, the fitting structure relationship between the cell holder and the side plate illustrated in FIGS. 8, 9, and 10 may be relationship in which the tenon and the mortise are reversed as illustrated in FIG. 11. For example, a structure such as a mortise and tenon structure illustrated in FIG. 11 is available.

In an example illustrated in FIG. 9, a fitting protrusion portion 22B is formed in a dovetail tenon shape extending over the side wall portion 22 in the sliding direction while a fitting recess portion 41B is formed in a dovetail mortise shape having a rectangular cross-section extending over the side surface opposed portion 41 in the sliding direction and fitted with the fitting protrusion portion 22B.

In an example illustrated in FIG. 10, a fitting protrusion portion 22C is formed in a gooseneck tenon shape extending over the side wall portion 22 in the sliding direction while a fitting recess portion 41C is formed in a gooseneck mortise shape having a rectangular cross-section extending over the side surface opposed portion 41 in the sliding direction and fitted with the fitting protrusion portion 22C.

In an example illustrated in FIG. 11, a fitting recess portion 22D is formed in a mortise shape having a rectangular cross-section extending over the side wall portion 22 in the sliding direction while a fitting protrusion portion 41D is formed in a tenon shape having a rectangular cross-section extending over the side surface opposed portion 41 in the sliding direction and fitted with the fitting recess portion 22D.

By actively providing one of these fitting structures, since the cell holder 2 can be positioned with high accuracy in the up-down and right-left directions of a plane perpendicular to the laminating direction of the battery cells, the battery module excellent in assembling performance and assembling accuracy can be produced. Thus, the battery module produced to have one of these structures is characterized by extremely high vibration resistance. Also, since the cell holders 2 can be arranged at arbitrary positions in the laminating direction of the battery cells 1, each battery block 8 can be fixed at a fixing position, that is, with fixing load, corresponding to the dimension of the battery block 8 even when there is a tolerance among the battery cells 1. As for the fitting structure, numerous patterns can be applied other than the aforementioned structures. Also, the fitting structure may be provided at a plurality of positions.

Although the base plate 5 is provided with one cooling tube 6, one tube processed in a U shape or S shape may be used, or a plurality of tubes may be used. The method for providing the cooling tube is not limited to these structures. Although the side plates 4 are used in the present embodiment, a guide member such as a metal band having a fitting structure may be used.

As described above, according to the present embodiment, since the cell holder 2 and the side plate 4 serving as the guide member are actively provided with the tenon and mortise fitting portion, the dovetail tenon and mortise fitting portion, the gooseneck tenon and mortise fitting portion, the mortise and tenon fitting portion, or the like to enable the cell holder 2 to slide against the side plate 4 and to be arranged at an arbitrary position, fixing in accordance with the dimension of the battery block 8 can be performed. Also, according to the present embodiment, since the side plate 4 serving as the guide member can be used for positioning of the cell holder 2, improvement in assembling performance and assembling accuracy of the battery module 9 can be achieved as well as the aforementioned fixing in accordance with the dimension, and the battery module 9 having extremely high vibration resistance can be produced.

The present invention has been described above by the embodiment. The battery module according to the present invention can be used as an in-vehicle battery module to be mounted on a hybrid car, a zero-emission electric car, or the like, which uses a motor as a driving source. Also, application of the battery module according to the present invention is not limited to the above application. The power supply device according to the present invention can be used as a power storage system that charges a battery and stores power with electric power generated by solar power generation, wind power generation, or the like for any of household use, commercial use, and industrial use, as a power storage system that charges a battery and stores power with nighttime electric power, or as a power storage system that can be used in an extraterrestrial place such as the space station, a spaceship, and a space platform. Further, for industrial use, the present invention can be applied to a power supply of a medical device, a construction machine, an electric power storage system, an elevator, an unmanned moving vehicle, or the like, or a power supply for a moving vehicle such as a golf cart and a turret vehicle.

REFERENCE SIGNS LIST

1 battery cell
2 spacer (cell holder)
3 end plate
4 side plate
5 base plate
6 cooling tube
7 rivet
8 battery block
9 battery module
11 battery can
12 battery lid
13 positive-electrode external terminal
14 negative-electrode external terminal
15 inlet
21 holding wall portion
22 side wall portion
22a opening portion
22A, 22B, 22C fitting protrusion portion
22D fitting recess portion
23 bottom wall portion
24 cut-out portion
25 upper wall portion
26 fitting protrusion portion
41 side surface opposed portion
41A, 41B, 41C fitting recess portion
41D fitting protrusion portion
42 upper surface opposed portion
43 fitting recess portion
44 slit

The invention claimed is:

1. A battery module provided with a battery block in which a plurality of rectangular battery cells are arranged and laminated, comprising:
   a spacer which intervenes between the plurality of battery cells;
   a guide member which slidably supports the spacer along a laminating direction of the battery cells;
   end plates as a pair which are respectively arranged on one side and the other side of the guide member in a sliding direction and which sandwich the battery block from both sides in the sliding direction;
   a fitting protrusion portion which is provided at one of the guide member and the spacer and which protrudes in a direction perpendicular to the sliding direction; and
   a fitting recess portion which is provided at the other of the guide member and the spacer, which is recessed in the direction perpendicular to the sliding direction, which extends along the sliding direction, and which is fitted with the fitting protrusion portion;
wherein:
   the guide member includes a pair of side surface opposed portions opposed to both side surfaces of the battery cell in a cell width direction, an upper surface opposed portion opposed to an upper surface of the battery cell on an upper side in a cell height direction, and a bottom surface opposed portion opposed to a bottom surface of the battery cell on a lower side in the cell height direction;
   the spacer includes a pair of side wall portions intervening between both the side surfaces of the battery cell in the cell width direction and the pair of side surface opposed portions, an upper wall portion intervening between the upper surface of the battery cell on the upper side in the cell height direction and the upper surface opposed portion, and a bottom wall portion intervening between the bottom surface of the battery cell on the lower side in the cell height direction and the bottom surface opposed portion; and the fitting recess portion is provided at the upper surface opposed portion, and the fitting protrusion portion is provided at the upper wall portion.

2. A battery module provided with a battery block in which a plurality of rectangular battery cells are arranged and laminated, comprising:
- a spacer which intervenes between the plurality of battery cells;
- a guide member which slidably supports the spacer along a laminating direction of the battery cells;
- end plates as a pair which are respectively arranged on one side and the other side of the guide member in a sliding direction and which sandwich the battery block from both sides in the sliding direction;
- a fitting protrusion portion which is provided at one of the guide member and the spacer and which protrudes in a direction perpendicular to the sliding direction; and
- a fitting recess portion which is provided at the other of the guide member and the spacer, which is recessed in the direction perpendicular to the sliding direction, which extends along the sliding direction, and which is fitted with the fitting protrusion portion;

wherein:
- the guide member includes a pair of side surface opposed portions opposed to both side surfaces of the battery cell in a cell width direction, an upper surface opposed portion opposed to an upper surface of the battery cell on an upper side in a cell height direction, and a bottom surface opposed portion opposed to a bottom surface of the battery cell on a lower side in the cell height direction;
- the spacer includes a pair of side wall portions intervening between both the side surfaces of the battery cell in the cell width direction and the pair of side surface opposed portions, an upper wall portion intervening between the upper surface of the battery cell on the upper side in the cell height direction and the upper surface opposed portion, and a bottom wall portion intervening between the bottom surface of the battery cell on the lower side in the cell height direction and the bottom surface opposed portion;
- the guide member includes a pair of side plates including the side surface opposed portions and the upper surface opposed portion and a base plate including the bottom surface opposed portion;
- the base plate is provided with a cooling path circulating a refrigerant therein; and
- the pair of side plates is provided at the upper surface opposed portion with slits at predetermined spaces in the sliding direction.

\* \* \* \* \*